(12) United States Patent
Wu et al.

(10) Patent No.: US 10,578,722 B2
(45) Date of Patent: Mar. 3, 2020

(54) SYSTEM AND METHOD FOR GLARE SUPPRESSION AND RANGING

(71) Applicant: Honeywell International Inc., Morris Plains, NJ (US)

(72) Inventors: Jianfeng Wu, Tucson, AZ (US); Matthew Wade Puckett, Scottsdale, AZ (US); Tiequn Qiu, Glendale, AZ (US); Glen A. Sanders, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 358 days.

(21) Appl. No.: 15/604,390

(22) Filed: May 24, 2017

(65) Prior Publication Data

US 2018/0275254 A1    Sep. 27, 2018

Related U.S. Application Data

(60) Provisional application No. 62/476,967, filed on Mar. 27, 2017.

(51) Int. Cl.
    *G01S 17/89*    (2020.01)
    *G06T 5/00*     (2006.01)
    (Continued)

(52) U.S. Cl.
    CPC .......... *G01S 7/4865* (2013.01); *G01S 7/4816* (2013.01); *G01S 7/4868* (2013.01); *G01S 7/4876* (2013.01);
    (Continued)

(58) Field of Classification Search
    CPC ........ G01S 7/4865; G01S 17/10; G01S 17/89; G01S 7/4868; G01S 7/51; G01S 17/08;
    (Continued)

(56) References Cited

U.S. PATENT DOCUMENTS 5,424,749 A    6/1995  Richmond

2014/0368807 A1    12/2014  Rogan
2017/0118423 A1 *   4/2017  Zhou .................. H04N 5/357

OTHER PUBLICATIONS

Anat Daniel et al., "Glare-Reducing Approaches Could Lead to a Type of Noise-Canceling Camera for Microscopy, Astronomy Imaging", "IEEE Journal of Lightwave Technology", Oct. 5, 2016, pp. 1-3, Publisher: IEEE.

Hotate et al., "Optical Coherence Domain Reflectometry by Synthesis of Coherence Function", "Journal of Lightwave Technology", Oct. 1993, pp. 1701-1710, vol. 11, No. 10, Publisher: IEEE.

Okugawa et al., "Synthesis of Arbitrary Shapes of Optical Coherence Function Using Phase Modulation", "IEEE Photonics Technology Letters", Dec. 1996, pp. 1710-1712, vol. 8, No. 12, Publisher: IEEE.

(Continued)

*Primary Examiner* — Daniel L Murphy
(74) *Attorney, Agent, or Firm* — Fogg & Powers LLC

(57) ABSTRACT

In one embodiment, a method of operating a glare reduction and ranging optical system having an image sensor with pixels is provided. The method comprises: generating a first light beam with a power spectral density; generating a reference light beam from the first light beam; emitting the first light beam with a power spectral density; collecting scattered light and reflected light respectively reflected from a scattering medium and a target; determining a power spectral density of the first light beam so that the first light beam is substantially coherent with the scattered light; adjusting the power spectral density of the first light beam so that the reference light beam is substantially coherent with the scattered light; on a pixel by pixel basis, modifying the amplitude and phase of the reference light beam to minimize the DC light power at each pixel; storing the modified amplitude and phase that results in a substantially minimum detected DC light power for each pixel; increasing power spectral density of a second reference light beam; modulating the amplitude of the second reference light beam with a sinusoidal signal having a frequency; on a pixel by pixel basis, detecting the substantially maximum signal level at the modulation frequency on a pixel by adjusting a second delay of the reference light beam; and determining range to a target.

16 Claims, 9 Drawing Sheets

(51) Int. Cl.
  G01S 7/4865 (2020.01)
  G01S 17/10 (2020.01)
  G01S 7/486 (2020.01)
  G01S 7/51 (2006.01)
  G01S 7/481 (2006.01)
  G01S 17/08 (2006.01)
  G01S 7/487 (2006.01)
  G01S 7/493 (2006.01)
  G01S 17/18 (2020.01)

(52) U.S. Cl.
  CPC ............. *G01S 7/493* (2013.01); *G01S 7/51* (2013.01); *G01S 17/08* (2013.01); *G01S 17/10* (2013.01); *G01S 17/18* (2020.01); *G01S 17/89* (2013.01); *G06T 5/003* (2013.01)

(58) Field of Classification Search
  CPC .... G01S 17/107; G01S 7/4816; G01S 7/4876; G01S 7/493; G06T 5/003
  USPC ....................................................... 356/4.01
  See application file for complete search history.

(56) References Cited

OTHER PUBLICATIONS

Pierrottet et al., "Linear FMCW Laser Radar for Precision Range and Vector Velocity Measurements", "MRS Online Proceeding Library Archive 1076", Jan. 2008, pp. 1-9.

Christian Wolff, "Frequency-Modulated Continuous-Wave Radar (FMCW Radar)", "http://www.radartutorial/eu/02.basics/Frequency%20Modulated%20Continuous%20Wave%20Radar.en.html", May 1, 2017, pp. 1-5, Publisher: Radar Tutorial—Radar Basics.

Zhou et al., "Glare Suppression by Coherence Gated Negation", "Optica", 2016, pp. 1107-1113, vol. 3, No. 10, Publisher: Optical Society of America.

Zhou et al., "Glare Suppression by Coherence Gated Negation: Supplementary Material", "https://doi.org/10.1364/OPTICA.3.001107", 2016, pp. 1-3, Publisher: Optica.

European Patent Office, "Extended European Search Report from EP Application No. 18162682.1 dated Jul. 30, 2018", from Foreign Counterpart to U.S. Appl. No. 15/604,390, pp. 1-9, Published: EP.

* cited by examiner

SYSTEM AND METHOD FOR GLARE SUPPRESSION AND RANGING

CROSS-REFERENCED TO RELATED APPLICATIONS

This application claims the benefit of provisional U.S. Patent Application Ser. No. 62/476,967 filed Mar. 27, 2017, which is incorporated herein by reference in its entirety.

BACKGROUND

Scattering media, interspersed between an optical imaging system and an imaging target, can create reflections, or glare, which obscures the target. The glare can significantly diminish the ability of the optical imaging system to detect and sense an image of the target, particularly if the optical reflection from the target is weak. Destructive optical interference can be used to suppress the glare. Optical imaging systems using destructive interference also can have better sensitivity than alternate imaging techniques.

Obtaining the range of an imaging target is necessary for some systems, e.g., remote sensing systems. Optical imaging systems employing destructive optical interference, however, are not capable of detecting the range of the imaging target. Therefore, there is a need for a technique that that facilitates both glare reduction and ranging in an optical imaging system.

SUMMARY

In one embodiment, a method of operating a glare reduction and ranging optical system having an image sensor with pixels is provided. The method comprises: generating a first light beam with a power spectral density; generating a reference light beam from the first light beam; emitting the first light beam with a power spectral density; collecting scattered light and reflected light respectively reflected from a scattering medium and a target; determining a power spectral density of the first light beam so that the first light beam is substantially coherent with the scattered light; adjusting the power spectral density of the first light beam so that the reference light beam is substantially coherent with the scattered light; on a pixel by pixel basis, modifying the amplitude and phase of the reference light beam to minimize the direct current (DC) light power at each pixel; storing the modified amplitude and phase that results in a substantially minimum detected DC light power for each pixel; increasing power spectral density of a second reference light beam; modulating the amplitude of the second reference light beam with a sinusoidal signal having a frequency; on a pixel by pixel basis, detecting the substantially maximum signal level at the modulation frequency on a pixel by adjusting a second delay of the reference light beam; and determining range to a target.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding background and summary, or the following detailed description.

Figure 1:
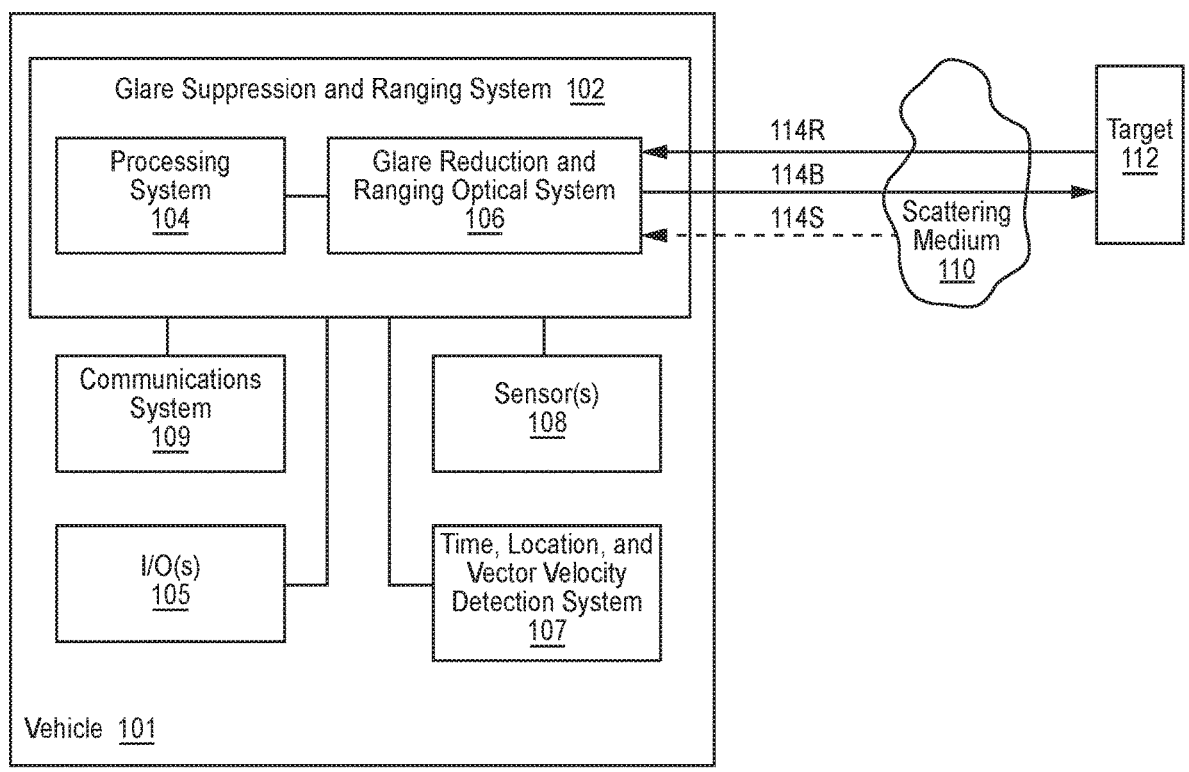
FIG. 1 illustrates one embodiment of a vehicle system including a glare reduction and ranging system.

FIG. 1 illustrates one embodiment of a vehicle 101 system including a glare reduction and ranging system 102. In another embodiment, the vehicle 101 may be an automobile, truck, train, airplane, helicopter, drone, ship, or any other type of vehicle. In a further embodiment, the vehicle 101 further includes at least one input/output device (I/O(s)) 105, at least one sensor 108, time, location and vector velocity detection system 107, and/or a communications system 109 coupled to the glare suppression and ranging system 102. In yet another embodiment, the at least one input/output device 105 includes one or more displays, and is used to display the image and/or range of the target 112, e.g., to the occupants of the vehicle 101.

In one embodiment, the glare reduction and ranging system 102 includes a processing system 104 coupled to a glare reduction and ranging optical imaging system 106. In another embodiment, the processing system 104 is located outside of the glare suppression and ranging system 102, e.g., elsewhere in the vehicle. In a further embodiment, the processing system 102 may be part of another system of the vehicle 101 such as a flight management system or flight management computer. In yet another embodiment, the at least one input/output device 105, at least one sensor 108 and/or a communications system 109 are coupled to the processing system 104 regardless of its location.

The glare reduction and ranging system 102 optically images and detects the range of a target 112 behind a scattering medium 110. In another embodiment, the target 112 can be any type of physical object, e.g., a vehicle, human, animal, or man-made or natural structure. In a further embodiment, the scattering medium can be a gas, liquid or solid object, e.g., a cloud, a fog, rain, or a reflective glass.

In one embodiment, the glare reduction and optical ranging system emits an output light beam 114B that is incident on the scattering media 110 and the target 112. A portion, even a substantial portion, of the output light beam 114B is scattered, or reflected from the scattering medium 110. A portion of the output light beam 114B, or scattered light 114S, is reflected back to the glare reduction and ranging optical imaging system 106. A portion of the output light beam 114B that reaches the target 112, or reflected light 114R is reflected back to the reduction and ranging optical imaging system 106. The power of the scattered light 114S may be significantly larger than the power of the reflected light 114R so as to make the reflected light 114R normally undetectable. However, the glare reduction and ranging optical imaging system 106 can suppress the scattered light 114S so that the reflected light 114R can be detected. Detecting the reflected light 114R permits imaging and determining the range of the target 112. The problems arising from optical glare are further described in Zhou et al., "Glare Suppression by Coherence Gated Negation," Optica, Vol. 3, No. 10, October 2016, pp. 1107-1113 and a corresponding published Supplementary Material, which are hereby incorporated by reference in their entirety.

In one embodiment, the at least one sensor 108 includes a LIDAR and/or RADAR. The at least one sensor 108 is configured to measure the distance from the at least one sensor 108 to the scattering medium 110 and/or the target 112. The processing system can thus estimate the time delays for the first and/or second variable optical delay lines subsequently described by: multiplying the distance by two and dividing by the speed of light. In another embodiment, a first offset distance from at least one sensor 108 and the glare suppression and ranging system 102 is known and stored in the processing system 104. The distances and time delays can be more accurately estimated by compensating for this first offset vector distance, which is a technique known to those skilled in the art.

In one embodiment, the communications system 109 comprises one or more of a HF, VHF, satellite, cellular network, Wi-Fi, Wi-Max, and/or AeroMACs communications transceivers and associated antennas. In another embodiment, the communications system 109 is coupled to the processing system 109. In a further embodiment, the three-dimensional locations and/or vector velocities of the scattering medium 110 and/or the target 112, e.g., their center of mass, may be measured by other vehicle(s), satellite(s), and/or ground station(s), e.g., by LIDAR and/or RADAR. Then, the measured three-dimensional locations and/or vector velocities are transmitted to the vehicle 101 through the communications system 109. In yet another embodiment, the ranging and imaging measurements of the target 112 made by the glare suppression and ranging system 102 are communicated to other vehicle(s), satellite(s), and/or ground station(s) through the communications system 109.

In one embodiment, the time, location, and vector velocity detection system 107 comprises a global navigation satellite system (GNSS) receiver, e.g., a GPS receiver, and/or an inertial management unit (IMU). In another embodiment, the IMU includes at least one gyroscope and/or at least one accelerometer. In a further embodiment, the GNSS receiver and IMU may be coupled to one another and/or the processing system 104. The time, location, and vector velocity detection system 107 monitors the current time, location of the vehicle 101, and vector velocity of the vehicle 101. In yet another embodiment, measurements made by the at least one sensor 108 and the glare reduction and ranging optical imaging system 106 are time stamped to improve the accuracy of ranging and corresponding time delay calculations; the times for the stamps originate from the time, location, and vector velocity detection system 107.

In one embodiment, the estimated location of the scattering medium 110 and/or the target 112 based on information are provided, through the communications system 109 to the processing system 104. Based upon this information, the processing system 104 can determine or estimate the relative distances (and thus the corresponding time delays) between the glare suppression and ranging system 102 and the scattering medium 110 and/or the target 112, even if both the vehicle 101, and the scattering medium 110 and/or the target 112 are moving. In another embodiment, a second offset vector distance from the location of the time, location, and vector velocity detection system 107 (or a corresponding location in the vehicle determined by this system), and the glare suppression and ranging system 102 is known and stored in the processing system 104. The distances and time delays can be more accurately estimated by accounting for the second offset vector distance in a manner known to those skilled in the art.

Figure 2:
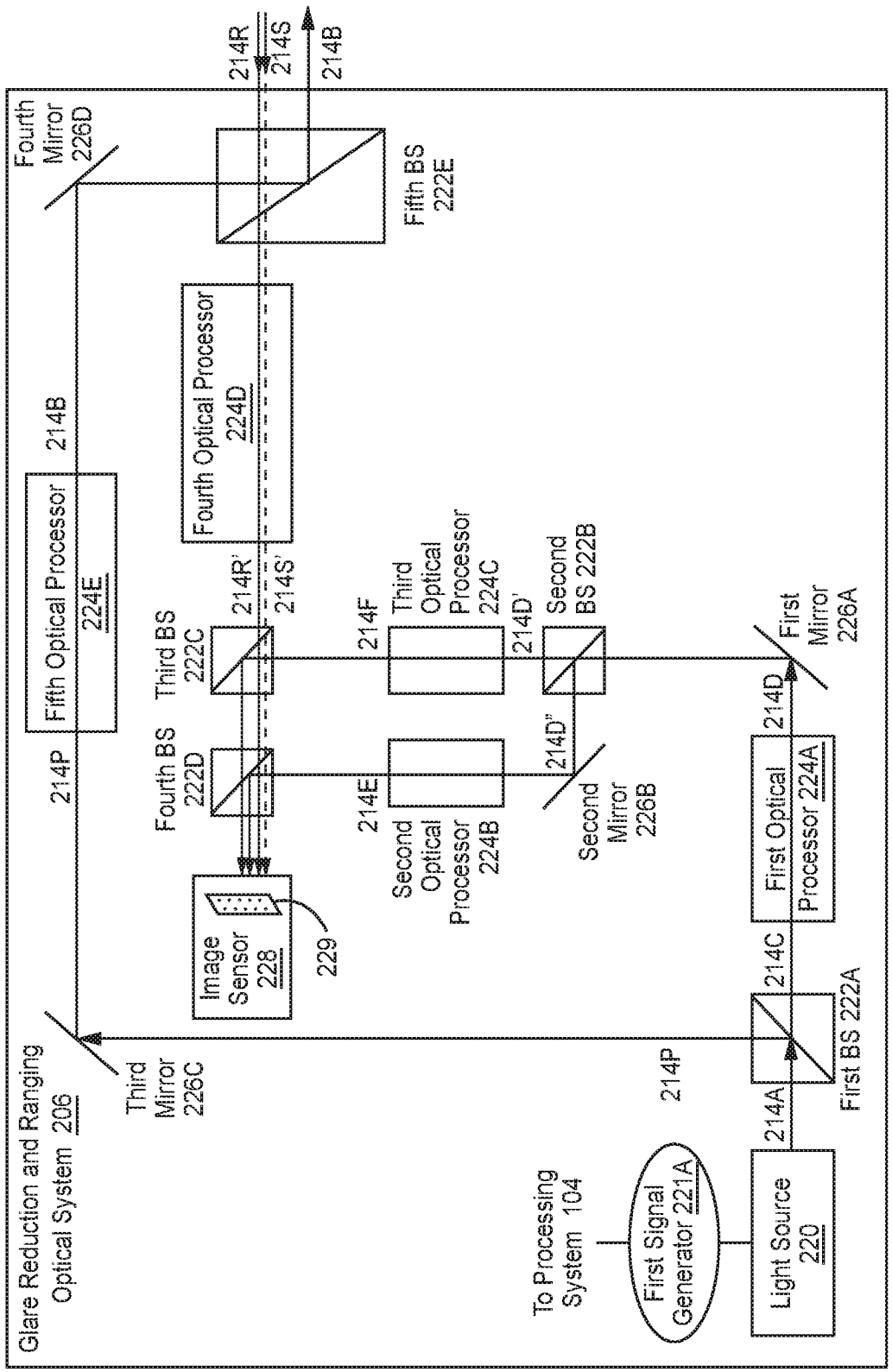
FIG. 2 illustrate one embodiment of a glare reduction and ranging optical imaging system.

FIG. 2 illustrates one embodiment of a glare reduction and ranging optical imaging system 206. The glare reduction and ranging optical imaging system 206 can be implemented in other ways. For example, the glare reduction and ranging optical imaging system 206 may be implemented with other implementations of mirrors.

The illustrated glare reduction and ranging optical imaging system 206 includes a light source 220, a first signal generator 221A, a first beam splitter (BS) 222A, a first mirror 226A, a second beam splitter 222B, a second mirror 226B, a second optical processor 224B, a third beam splitter 222C, an image sensor 228, a third mirror 226C, a fourth mirror 226D, a fourth beam splitter 222D, and a fifth beam splitter 222E. In another embodiment, the glare reduction and ranging optical imaging system 206 includes a first optical processor 224A. In a further embodiment, the image sensor 228 is a high-speed optical detector with fine temporal resolution, such as an intensified charge-coupled device or a single photon avalanche diode array. In yet another embodiment, the image sensor 228 has X by Y pixels 229, e.g., 100 by 100 pixels. In yet another embodiment, the pixel size is smaller than corresponding image speckle size to ensure that no phase variations occur across the surface of any given pixel.

In one embodiment, the light source 220 is a laser, e.g., a current controlled distributed Bragg reflector laser which may be a semiconductor laser. In another embodiment, the light source 220 operates at about 1550 nanometer wavelength. The first signal generator 221A is coupled to the light source 220. The first signal generator 221A generates a signal, e.g., a current signal that has a first power spectral density in the frequency domain (corresponding to a first coherence function in the time domain) on the carrier frequency of the light source 220. In a further embodiment, the first coherence function and the first power spectral density have Gaussian distributions. However, the first power spectral density can be implemented to generate any arbitrary coherence function. Thus, the light source 220 generates a source light beam 214A that is continuous wave with the first power spectral density. In yet another embodiment, the light source 220 emits a linearly (vertically or horizontally) polarized light beam.

In one embodiment, the first signal generator 221A is coupled to the processing system 104. In another embodiment, the processing system 104 controls the power spectral density of the source light beam 214A by controlling the signal generated by the first signal generator 221A. In a further embodiment, the first signal generator 221A is an arbitrary waveform generator.

The following is undertaken when the source light beam 214A is projected on a target 112, e.g., through a scattering medium 110. In one embodiment, initially, the power spectral density of the source light beam 214A is the default power spectral density, e.g., having a relatively narrow Gaussian distribution, generated by the light source 220. Subsequently, the width of the power spectral density of the source light beam 214A is increased in steps. In another embodiment, this is accomplished by the processing system 104 controlling the first signal generator 221A to generate a signal that correspondingly creates the desired power spectral density of the source light beam 214A. As the width of the power spectral density of the source light beam 214A is increased, the width of the corresponding coherence function is decreased.

For each step, including the default power spectral density, the processing system 104 determines, and e.g., stores, the maximum and minimum grey scale values (at different pixels) detected by the image sensor 228, and thus the detected grey scale dynamic range. In one embodiment, the grey scale ranges from zero (total absence of incident signal, or black) to one (total presence of incident signal, or white). In a further embodiment, the processing system 104 determines, and e.g., stores, a local maximum of the dynamic range (e.g., maximum difference between a maximum grey scale value and a minimum grey scale value at different pixels of the image sensor 228), and the corresponding power spectral density. The maximum grey scale dynamic range corresponds to when the source light beam 214A is highly coherent with the scattered light 114S so that the scattered light 114S can be cancelled, or substantially cancelled, by the glare suppression and ranging system 102. The processing system 104 then controls the first signal generator 221A to generate a signal that causes source light beam 214A to generate a signal having a power spectral density corresponding to the maximum grey scale dynamic range.

The source light beam 214A is then incident upon the first beam splitter 222A. In one embodiment, one or more of the beam splitters described herein are cube beam splitters or plate beam splitters. The first beam splitter 222A splits the source light beam 214A into a pre-output light beam 214P and a first reference light beam 214C.

In one embodiment, the first reference light beam 214C is coupled to a first optical processor 224A. In this embodiment, the first optical processor 224A optically processes the first reference light beam 214C, as will be subsequently exemplified, and generates a processed first reference light beam 214D. However, if the first optical processor 224 is not utilized, the first reference light beam 214C shall herein also be referred to, and be the same as, the second reference light beam 214C In one embodiment, a processed first reference light beam 214D is then incident upon a first mirror 226A that reflects the processed first reference light beam 214D, e.g., at a ninety-degree angle. In another embodiment, the processed first reference light beam 214D is then incident upon a second beam splitter 222B which splits the processed first reference light beam 214D so that a first portion of the processed first reference light beam 214D' is coupled to a third optical processor 224C, and a second portion of the processed first reference light beam 214D" is coupled to a second optical processor 224B. In a further embodiment, a second mirror reflects, e.g., at a ninety-degree angle, the second portion of the processed first reference light beam 214D" so that it is coupled to the second optical processor 224B.

The second optical processor 224B optically processes the second portion of the processed first reference light beam 214D", as will be subsequently exemplified, and generates a second reference light beam 214E. The second reference light beam 214E is incident upon a fourth beam splitter 222D that directs the second reference light beam 214E to the image sensor 228.

The first portion of the processed first reference light beam 214D' is coupled to a third optical processor 224C. The third optical processor 224C optically processes the first portion of the processed first reference light beam 214D' as will be subsequently exemplified, and generates a third reference light beam 214F. The third optical processor 224C couples the third reference light beam 214F to the third beam splitter 222C. The third beam splitter 222C directs the third reference light beam 214F to the fourth beam splitter 222D. The fourth beam splitter 222D directs third reference light beam 214F to the image sensor 228.

In one embodiment, the pre-output light beam 214P is directed to a fifth optical processor 224E. In another embodiment, the pre-output light beam 214P is reflected, e.g., by a ninety-degree angle, by the third mirror 226C and directed to the fifth optical processor 224E. The fifth optical processor 224E optically processes the pre-output light beam 214P as will be subsequently exemplified, and generates an output light beam 214B. The fifth optical processor 224E directs the output light beam 214B to a fifth beam splitter 222E. In a further embodiment, the output light beam 214B is reflected, e.g., by a ninety-degree angle, by the fourth mirror 226D and directed to the fifth beam splitter 222E. After passing through the fifth beam splitter 222E, the output light beam 214B is emitted from the glare reduction and ranging optical imaging system 206, e.g., into free space toward the target 112.

In one embodiment, the scattered light 214S and the reflected light 214R are reflected, respectively from the scattering medium 110 and the target 112, back to the glare reduction and ranging optical imaging system 206. The scattered light 214S and the reflected light 214R are incident upon and pass through the fifth beam splitter 222E.

The scattered light 214S and the reflected light 214R are coupled to the fourth optical processor 224D by the fifth beam splitter 222E. The fourth optical processor 224D optically processes the scattered light 214S and the reflected light 214R as will be subsequently exemplified, and generates a processed scattered light 214S' and a processed reflected light 214R'.

The processed scattered light 214S' and the processed reflected light 214R' are coupled from the fourth optical processor 224D to the third beam splitter 222C. The third beam splitter 222C couples the processed scattered light 214S' and the processed reflected light 214R' to the fourth beam splitter 222D. The fourth beam splitter 222D couples the processed scattered light 214S' and the processed reflected light 214R' to the image sensor 228.

In one embodiment, the image sensor 228 and each pixel therein has a linear response to optical power. In another embodiment, the image sensor 228 and each pixel therein have a square law response to optical fields. Because of the non-linear response, the processed scattered light 214S', the processed reflected light 214R', the second reference light beam 214E, and the third reference light beam 214F are mixed and generate mixing products. Detection of the desired mixing products and suppression of the undesired mixing products permits glare reduction, imaging of the target 112, and ranging of the target 112, and will be subsequently described.

Figure 3:
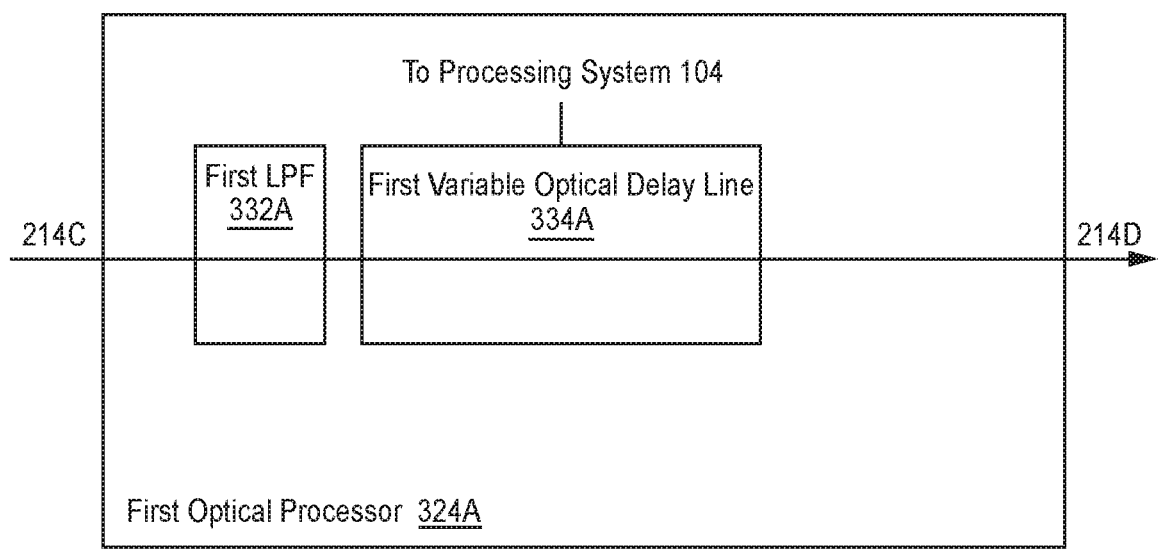
FIG. 3 illustrate one embodiment of a first optical processor.

FIG. 3 illustrates one embodiment of the first optical processor 324A. The illustrated first optical processor includes a first linear polarizing filter (LPF) 332A. In another embodiment, the first optical processor 324A includes a first variable optical delay line 334A. The first variable optical delay line 334A is coupled to the processing system 104. In another embodiment, the first optical processor 324A only includes the first variable optical delay line 334A. The first polarizing filter 332A, and the corresponding polarizing filters in the fourth optical processor 224D and the fifth optical processor 224E, have the same linear polarization (vertical or horizontal) as the linear polarization of the source light beam 214A generated by the light source 220 to facilitate suppression of the scattered light 214S, imaging of the target 112, and ranging of the target 112.

The first reference light beam 214C is filtered by a first linear polarizing filter (LPF) 332A, so that only desired linearly polarized light continues to propagate. In one embodiment, the linear polarizers describe herein are formed from a polymer. The linearly polarized first reference light beam is then passed through a first variable optical delay line 334A. In another embodiment, the variable optical delay lines describe herein a programmable or electronically controlled electronic or electromechanical variable optical delay line using optical fiber, microelectromechanical systems, and/or solid state devices.

In one embodiment, the delay of the first optical delay line 334A is controlled, e.g., programmed, by the processing system 104, e.g., to be equal to the delay in the time delay of the transmission and reflection paths of the scattered light 214S which is reflected from the scattering medium 110. In another embodiment, this time delay is known, or is calculated from distance data provided by external sources or generated by the at least one sensor 108 as described above.

Figure 4:
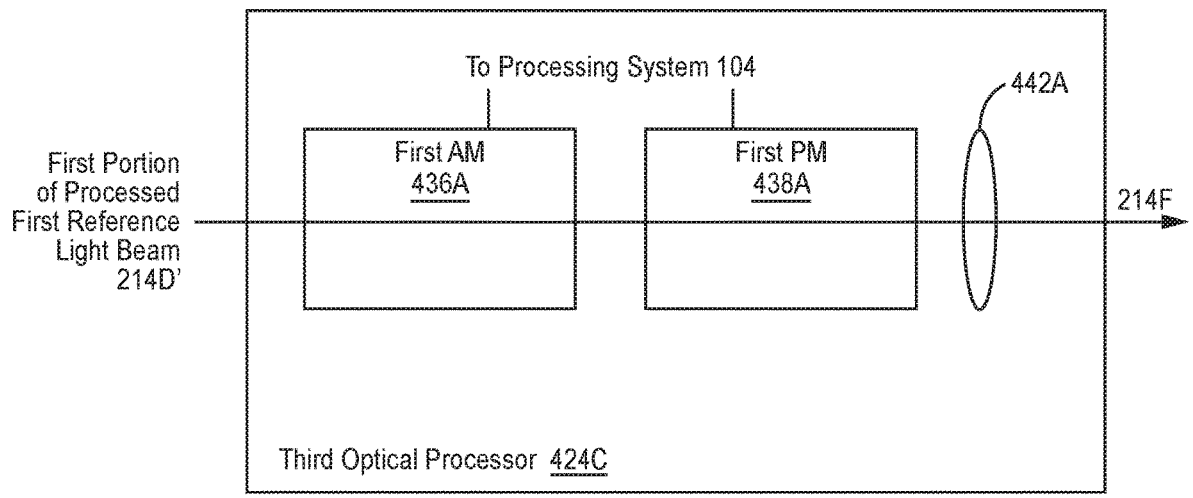
FIG. 4 illustrates one embodiment of a third optical processor.

FIG. 4 illustrates one embodiment of the third optical processor 424C. The first portion of the first reference light beam 214D' is coupled to the third optical processor 424C. The third optical processor 424C emits the third reference light beam 214F.

The illustrated third optical processor 424C includes a first optical amplitude modulator (AM) 436A coupled to a first optical phase modulator (PM) 438A. In another embodiment, the first optical amplitude modulator 436A and the first optical phase modulator 438A are coupled to and controlled by the processing system 104. In further embodiment, the first optical amplitude modulator 436A and the first optical phase modulator 438A are electronically programmable devices. In yet another embodiment, the optical amplitude modulators described herein are electronically controllable Pockels cell type modulators including two matched lithium niobate crystals. In yet a further embodiment, the optical phase modulators described herein are electronically controllable and include a crystal having optical phase shift that changes based upon the level of a voltage applied across the crystal.

In one embodiment, for each pixel of the image sensor 228, the first optical amplitude modulator 436A and the first optical phase modulator 438A is permutated through a range of amplitude and phase values, e.g., N amplitude steps and Y phase steps. The cancellation of the undesired scattered light 214S can be increased by adjusting the integer numbers of N and Y.

The DC signal amplitude detected by each pixel for each combination of amplitude and phase is measured. The set of amplitude and phase values generating the lowest DC signal amplitude detected by each pixel is stored; this set corresponds to amplitude and phase values, for each pixel, generates a destructive optical interference of that provides substantially maximum cancellation of the power of the undesired scattered light 214S. To achieve the destructive optical interference, the second reference light beam 214F has substantially the same amplitude but a phase that is one hundred and eighty degrees out of phase respectively from the phase of the processed scattered light 214S'. The signal having the lowest DC component represents the image signal of target on the pixel.

Then, on a pixel by pixel basis, the processing system 104 can electronically control the amplitude and phase settings of respectively the first optical amplitude modulator 436A and the first optical phase modulator 438A to provide substantially maximum cancellation of the interference of the undesired scattered light 214S. As a result, the imaging and ranging of the target 112 can be determined more accurately.

In one embodiment, the third optical processor 424C includes a first lens 442A, e.g., a collimating lens. In another embodiment, the output of the first optical phase modulator 438A is coupled to the first lens 442A, and the output of the first lens 442A is the second reference light beam 214F.

Figure 5:
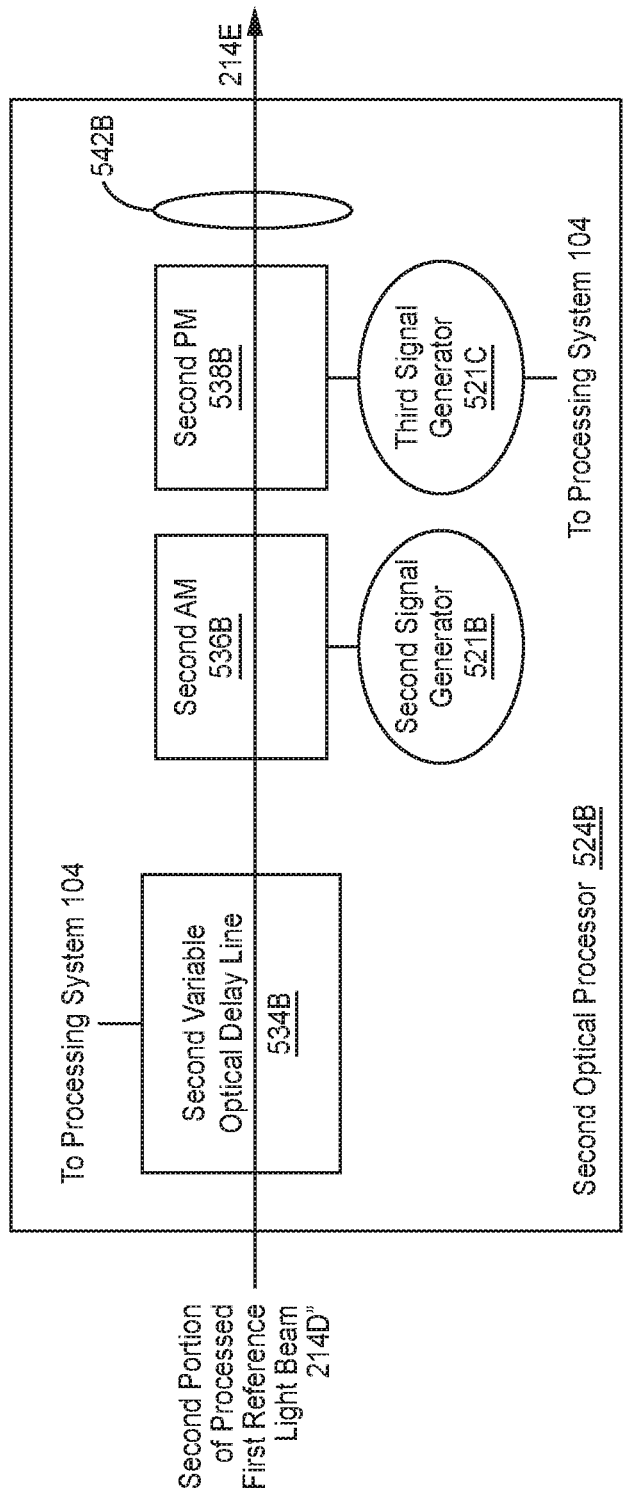
FIG. 5 illustrates one embodiment of a second optical processor.

FIG. 5 illustrates one embodiment of the second optical processor 524B. The second portion of the first reference light beam 214D" is coupled to the second optical processor 524B. The second optical processor 524B emits the second reference light beam 214E.

The illustrated second optical processor 524B includes a second variable optical delay line 534B which is coupled to a second optical amplitude modulator 536B. A second signal generator 521B is also coupled to the second optical amplitude modulator 536B.

In one embodiment, the second optical amplitude modulator is coupled to a second optical phase modulator 538B. The second optical phase modulator 538B is coupled to a third signal generator 521C. In another embodiment, the second variable optical delay line 534B is coupled to and controlled, e.g., programmed, by the processing system 104.

The second signal generator 521B generates a sine wave that amplitude modulates the second portion of the first reference light beam 214D. Although the frequency of the sine wave may be relatively low, by modulating the second portion of the first reference light beam 214D, the second portion of the first reference light beam 214D will not include a time varying DC component that interferes with obtaining substantially maximum cancellation of the scattered light 214S. In one embodiment, the frequency of the sine wave is between 1 kHz and 1 MHz The third signal generator 521C generates a signal that modulates the second phase modulator 538B to cause the second portion of the first reference light beam 214D" to have a power spectral density that is broader than, and thus a coherence function narrower than, respectively the power spectral density and coherence function of the output light beam 214B and hence the processed reflected light 214R'. In one embodiment, the power spectral density and coherence function of the second portion of the first reference light beam 214D" have Gaussian distributions. Because the coherence function of the second reference light beam 214E is diminished, the precision of the measurement of range of the target 112 is increased. In another embodiment, the third signal generator 521C is coupled to the processing system 104 that controls the third signal generator 521C to generate a signal that causes the first reference light beam 214D" to have a power spectral density that is broader than, and thus a coherence function narrower than, respectively the power spectral density and coherence function of the output light beam 214B. In a further embodiment, the third signal generator 521C is implemented with an arbitrary waveform generator.

Returning to the second variable optical delay line 534B, in one embodiment, on a pixel by pixel basis, the delay of the second variable optical delay line 534B is increased, e.g., incrementally, from zero delay. In another embodiment, the delay of the second variable optical delay line 534B is not varied on a pixel by pixel basis.

The measured output, e.g., a voltage or a current level, of a pixel will reach a substantially maximum or peak at the frequency of amplitude modulation, e.g., the sine wave, when such delay is equal to or approximates the round-trip distance between the target and the scattering medium 110, e.g., the center of masses of the target 112 and the scattering medium 110. The time delay value is used to calculate the distance of the target.

Therefore, the sum of the delays of the first variable optical delay line 334A and the second variable optical delay line 534B equal the round-trip time for the reflected light 214. Thus, the distance from the glare reduction and ranging optical imaging system 206 from the target is the sum of the delays, of the first variable optical delay line 334A and the second variable optical delay line 534B, divided by two multiplied by the speed of light. In one embodiment, such distance can be determined in the processing system 104.

In one embodiment, the second optical processor 524B includes a second lens 542B, e.g., a collimating lens. In another embodiment, the optical output of the second optical phase modulator 538B is coupled to the second lens 542B, and the output of the second lens 542B is the second reference light beam 214E.

Figure 6:
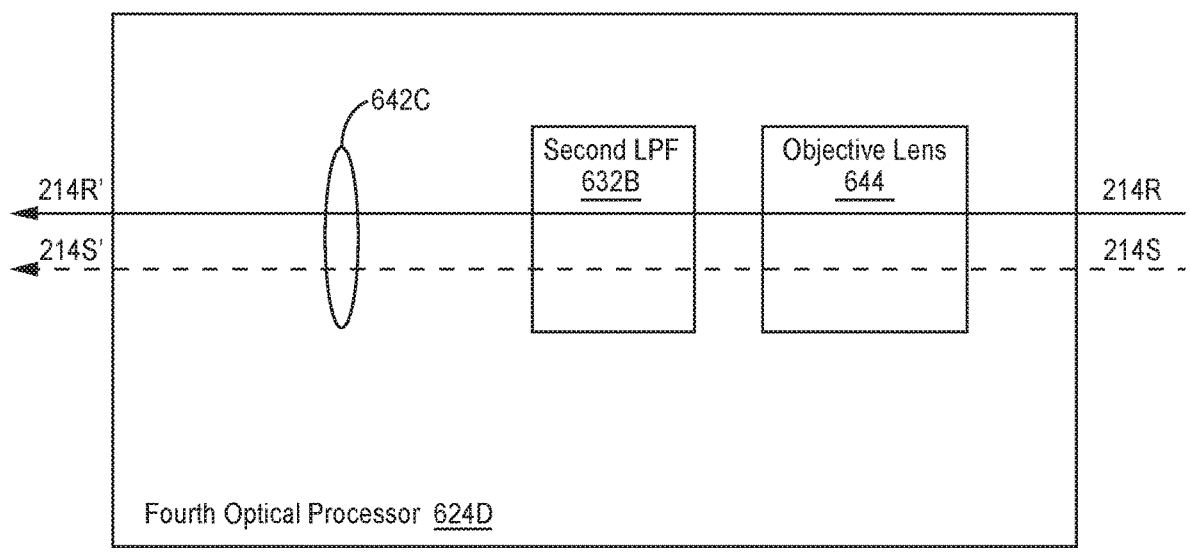
FIG. 6 illustrates one embodiment of a fourth optical processor.

FIG. 6 illustrates one embodiment of the fourth optical processor 624D. The scattered light 214S and the reflected light 214R are coupled to the fourth optical processor 624D. The fourth optical processor 624D emits the processed scattered light 214S' and the processed reflected light 214R'.

The illustrated fourth optical processor 624D includes an objective lens 644 which is coupled to a second linear polarizing filter 632B. The objective lens 644 gathers the scattered light 214S and the reflected light 214R. The gathered scattered light 214S and reflected light 214R are then filtered by the second linear polarizing filter 632B, so that only intended linearly polarized light passes through the fourth optical processor 624D.

In one embodiment, the fourth optical processor 624D includes a third lens 642C, e.g., a collimating lens. In another embodiment, the optical output of the second linear polarizing filter 632B is coupled to the third lens 642C, and the output of the third lens 642C is the processed scattered light 214S' and the processed reflected light 214R'.

Figure 7:
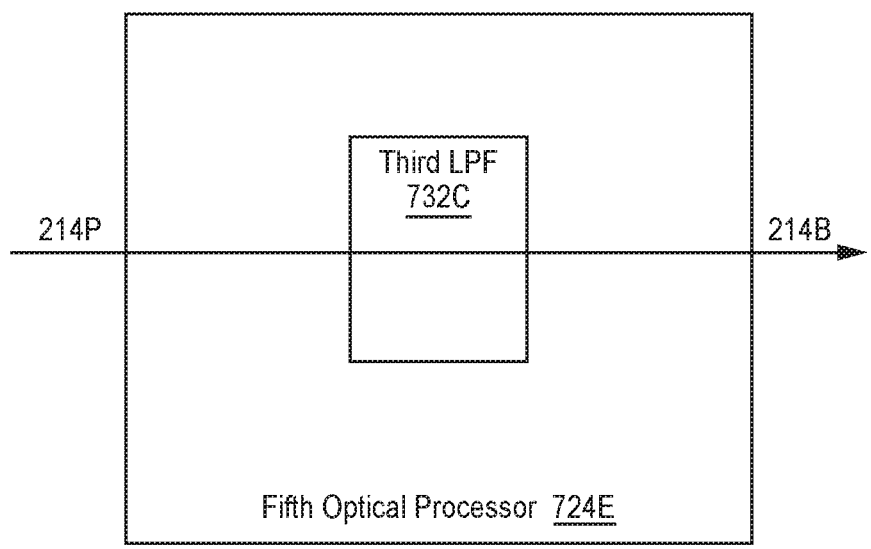
FIG. 7 illustrates one embodiment of a fifth optical processor.

FIG. 7 illustrates one embodiment of the fifth optical processor 724E. The pre-output light beam 214P is coupled to the fifth optical processor 724E. The fifth optical processor 724E emits the output light beam 214B.

The illustrated fifth optical processor 724E includes a third linear polarizing filter 732C. The pre-output light beam 214P is filtered by the third linear polarizing filter 732C, so that only intended linearly polarized light passes through the fifth optical processor 724E.

Figure 8:
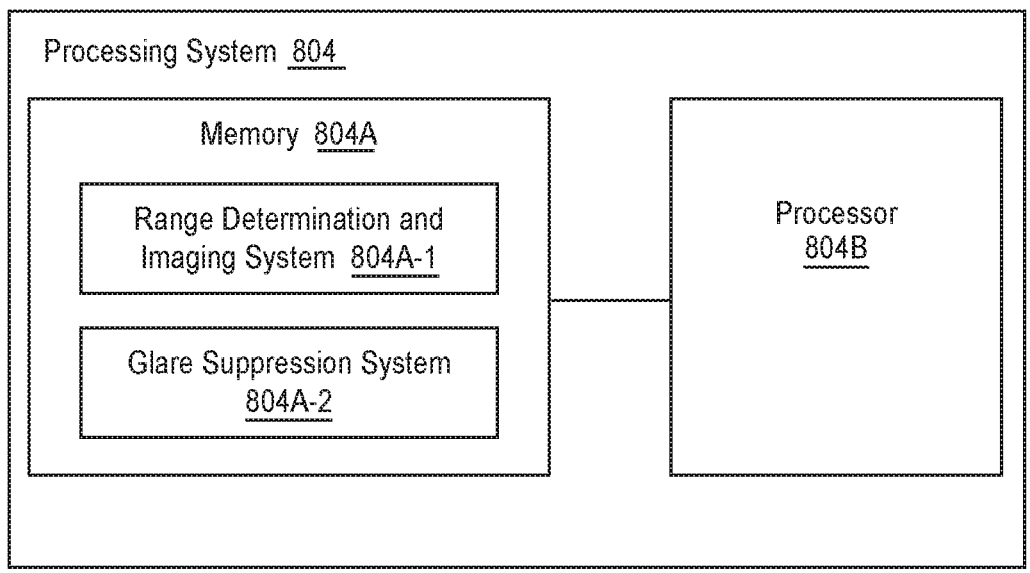
FIG. 8 illustrates one embodiment of the processing system.

FIG. 8 illustrates one embodiment of the processing system 804. The illustrated embodiment includes a memory 801A coupled to a processor 804B. In another embodiment, all or part of the memory 801A coupled to the processor 804B may be implemented by a state machine or a field programmable gate array.

In one embodiment, the memory 801A comprises a range determination and imaging system 804A-1 and a glare suppression system 804A-2. In another embodiment, the range determination system and imaging system 804A-1 determines and controls the delay settings for the first variable optical delay line 334A and the second variable optical delay line 534B using the techniques described herein. For example, a first-time delay for the first variable optical delay line 334A can be determined by measuring the range, using LIDAR and/or RADAR, between the vehicle 101 and the scattering medium 110. The time delay for the first variable optical delay line 334A can be calculated from the measured range as described herein. Also, for example, a second-time delay for the second variable optical delay line 534B can be determined by increasing the second-time delay, e.g., from zero, until a substantially peak or maximum value, of the mixing product of the second reference light beam 214E and the processed reflected light 214R', is detected. In another embodiment, the range determination and imaging system 804A-1 identifies and stores such maximum or values, and corresponding second-time delay, on a pixel by pixel basis. Thus, the range determination and imaging system 804A-1 also stores the image of the target 112.

In one embodiment, the glare suppression system 804A-2 stores amplitude and phase settings with which to step the amplitude and phase settings of respectively the first optical amplitude modulator 436A and the first optical phase modulator 436B for each pixel 229 of the image sensor 228. The glare suppression system 804A-2 also stores the measured DC values and corresponding amplitude and phase settings. The glare suppression system 804A-2 further identifies and stores, for each pixel 229, the minimum measured DC values and corresponding amplitude and phase settings.

In one embodiment, the glare suppression system 804A-2 includes an interpolation system that improves glare suppression. The interpolation system calculates amplitude and phase settings that would provide the minimum DC value based upon the measured DC values and corresponding pairs of amplitude and phase settings. In another embodiment, the interpolation system uses least means squares fitting to calculate the minimum DC value and corresponding pair of amplitude and phase settings.

Figure 9:
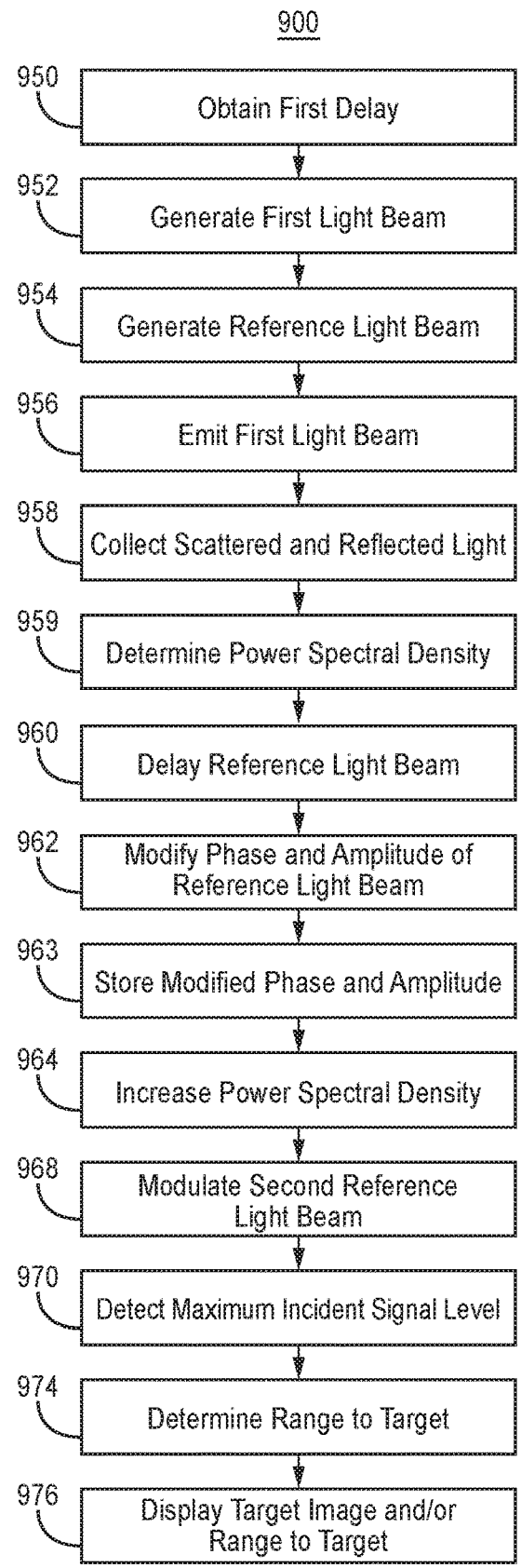
FIG. 9 illustrates one embodiment of a method for glare suppression and ranging.

FIG. 9 illustrates one embodiment of a method 900 for glare suppression and ranging. To the extent that the embodiment of method 900 shown in FIG. 9 is described herein as being implemented in the systems shown in FIGS. 1 through 8, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

In one embodiment, in block 950, obtain a first delay, substantially equal to the round-trip delay to the scattering medium 110, e.g., from the glare reduction and ranging optical imaging system 106. In another embodiment, obtain the delay, e.g., from the memory 804A of the processing system 804. In a further embodiment, obtain a distance to the scattering medium 110 from at least one sensor 108, e.g., LIDAR or RADAR; determine the first delay from the measured distance. In a further embodiment, obtain the location of the scattering medium 110, e.g., through a communications system 109 from another vehicle, ground station or satellite, and calculate the first delay.

In block 952, generate an output light beam 114B with a power spectral density corresponding to a specific coherence function. In one embodiment, the power spectral density and the corresponding coherence function have a Gaussian distribution.

In block 954, generate a reference light beam from the first light beam. In block 956, emit the first light beam with a power spectral density, e.g., towards scattering medium 110 and target 112.

In block 958, collect scattered light 214S and reflected light 214R respectively reflected from a scattering medium 110 and a target 112. In block 959, determine the power spectral density of the output light beam 114B corresponding to a maximum grey scale dynamic range measured by the sensor, e.g., as described above, so that the output light beam 114B, and thus a first reference light beam, is substantially coherent with the scattered light 114S. In another embodiment, adjust the power spectral density of the output light beam 114B so that the output light beam 114B, and thus the first reference light beam, is substantially coherent with the scattered light 114S.

In one embodiment, in block 960, delay the reference light beam by the first delay. In block 962, on a pixel by pixel basis modify the amplitude and phase of the delayed reference light beam to be respectfully substantially equal to and one hundred and eighty degrees out of phase from the collected scattered light 214S (e.g., to substantially cancel the collected scattered light 214S incident at each pixel) which results in a substantially minimum detected DC light power, or minimum DC light power, at each pixel. In one embodiment, in block 963, store the corresponding modified amplitude and phase of the reference light beam (which in one embodiment is delayed); in another embodiment, store the minimum DC light power at each pixel. In a further embodiment, store the settings of the first amplitude modulator 436A and the first phase modulator 438A. In another embodiment, calculate by interpolation (based on measurements and corresponding phase and amplitude values), the modified amplitude and phase of the delayed reference light beam that results in a minimum detected DC light power at each pixel.

In block 966, increase power spectral density of a second reference light beam, e.g., the second portion of the first reference light beam 214D", to be broader than, and thus have a coherence function narrower than, respectively the power spectral density and coherence function of the output light beam 214B. In block 968, modulate the amplitude of the first reference beam, which in one embodiment is delayed, with a sinusoidal signal.

In block 970, on a pixel by pixel basis detect the substantially maximum incident signal level, at the modulation frequency of the sinusoidal signal, on a pixel by adjusting, e.g., incrementally increasing, a second delay of the reference light beam from zero delay until a substantially maximum incident light level incident a pixel is detected. Prior to increasing the second delay for a pixel, adjust the amplitude and phase of the reference beam to substantially cancel the collected scattered light 214S incident at the pixel. In one embodiment, perform block 970 for a subset of all pixels of the image sensor 228.

In one embodiment, store the substantially maximum incident light level for each pixel. In another embodiment, in block 974, calculate the range to the target 112, e.g., by adding the first delay (which would be zero if no first delay is used) and second delay, dividing the resulting sum by two and multiplying the resulting product by the speed of light. In a further embodiment, calculate the range on a pixel by pixel basis, or alternatively average all of the second delays measured on a pixel by pixel basis. In yet another embodiment, in block 976, display the image of the target 112, e.g., the substantially minimum incident DC light levels for each pixel, and the calculated range.

Example Embodiments

Example 1 is a method of operating a glare reduction and ranging optical imaging system having an image sensor with pixels, the method comprising: generating a first light beam with a power spectral density; generating a reference light beam from the first light beam; emitting the first light beam with a power spectral density; collecting scattered light and reflected light respectively reflected from a scattering medium and a target; determining a power spectral density of the first light beam so that the first light beam is substantially coherent with the scattered light; adjusting the power spectral density of the first light beam so that the reference light beam is substantially coherent with the scattered light; on a pixel by pixel basis, modifying the amplitude and phase of the reference light beam to minimize the DC light power at each pixel; storing the modified amplitude and phase that results in a substantially minimum detected DC light power for each pixel; increasing power spectral density of a second reference light beam; modulating the amplitude of the second reference light beam with a sinusoidal signal having a frequency; on a pixel by pixel basis, detecting the substantially maximum signal level at the modulation frequency on a pixel by adjusting a second delay of the reference light beam; and determining range to a target.

Example 2 is the method of Example 1, further comprising displaying at least one of: an image of the target and the calculated range.

Example 3 is the method of any of Examples 1-2, further comprising delaying the reference light beam by a first delay.

Example 4 is the method of any of Examples 1-3, further comprising obtaining a first delay substantially equal to the round-trip delay between a scattering medium and the glare reduction and ranging optical imaging system.

Example 5 is the method of Example 4, wherein obtaining a first delay comprises obtaining a first delay from at least one sensor Example 6 is the method of any of Examples 1-5, wherein storing the modified amplitude and phase that results in the substantially minimum detected DC light power for each pixel comprises storing the modified amplitude and phase determined by interpolation.

Example 7 is a glare suppression and ranging system, comprising: a processing system; a glare reduction and ranging optical system, coupled to the processing system, comprising: a light source generating a source light beam; a first signal generator coupled to the light source; wherein the first signal generator is configured to modify power spectral density of the source light beam; a first beam splitter optically coupled to the source light beam; wherein the first beam splitter creates an output light beam and a first reference light beam; wherein the output light beam is configured to be emitted, and generate a scattering beam and a reflected beam; a second beam splitter optically coupled to the first reference light beam; wherein the second beam splitter creates a second reference light beam; a first optical processor configured to adjust the amplitude and phase of the first reference light beam; a second optical processor configured to adjust delay, power spectral density, and frequency modulate the second reference light beam; and an image sensor comprising pixels configured to receive the scattering beam, reflected beam, adjusted first light reference beam, and adjusted second reference light beam.

Example 8 is the glare suppression and ranging system of Example 7, further comprising a third optical processor configured to adjust the delay of the source light beam.

Example 9 is the glare suppression and ranging system of any of Examples 7-8, wherein the processing system further comprises: a memory; a processor coupled to a memory.

Example 10 is the glare suppression and ranging system of Example 9, wherein the memory comprises a range determination and imaging system and a glare suppression system.

Example 11 is the glare suppression and ranging system of any of Examples 7-10, wherein the first optical modulator comprises: a first amplitude modulator coupled to the processing system; and a first phase modulator coupled to the amplitude modulator and the processing system.

Example 12 is the glare suppression and ranging system of any of Examples 7-11, wherein the second optical modulator comprises: a first variable optical delay line; a second amplitude modulator coupled to the first optical delay line; a second phase modulator coupled to the second amplitude modulator; a second signal generator coupled to the second amplitude modulator; and a third signal generator coupled to the second phase modulator and the processing system.

Example 13 is the glare suppression and ranging system of any of Examples 7-12, further comprising an objective lens optically coupled to the image sensor.

Example 14 is a system, comprising: a glare suppression and ranging system, comprising: a processing system; a glare reduction and ranging optical system, coupled to the processing system, comprising: a light source generating a source light beam; a first signal generator coupled to the light source; wherein the first signal generator is configured to modify power spectral density of the source light beam; a first beam splitter optically coupled to the source light beam; wherein the first beam splitter creates an output light beam and a first reference light beam; wherein the output light beam is configured to be emitted, and generates scattering beam and a reflected beam; a second beam splitter optically coupled to the first reference light beam; wherein the second beam splitter creates a second reference light beam; a first optical processor configured to adjust the amplitude and phase of the first reference light beam; a second optical processor configured to adjust delay, power spectral density, and frequency modulate the second reference light beam; and an image sensor comprising pixels configured to receive the scattering beam, reflected beam, adjusted first light reference beam, and adjusted second reference light beam; and at least one input/output device.

Example 15 is the system of Example 14, further comprising at least one of: (a) at least one sensor coupled to the glare suppression and ranging system, (b) a time, location and vector velocity detection system coupled to the glare suppression and ranging system, and (c) a communications system coupled to the glare suppression and ranging system.

Example 16 is the glare suppression and ranging system of any of Examples 14-15, further comprising a third optical processor configured to adjust the delay of the source light beam.

Example 17 is the glare suppression and ranging system of any of Examples 14-16, wherein the processing system further comprises: a memory; a processor coupled to a memory.

Example 18 is the glare suppression and ranging system of any of Examples 14-17, wherein the memory comprises a range determination and imaging system and a glare suppression system.

Example 19 is the glare suppression and ranging system of any of Examples 14-18, wherein the first optical modulator comprises: a first amplitude modulator coupled to the processing system; and a first phase modulator coupled to the amplitude modulator and the processing system.

Example 20 is the glare suppression and ranging system of any of Examples 14-19, wherein the second optical modulator comprises: a first variable optical delay line; a second amplitude modulator coupled to the first optical delay line; a second phase modulator coupled to the second amplitude modulator; a second signal generator coupled to the second amplitude modulator; and a third signal generator coupled to the second phase modulator and the processing system.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. A method of operating a glare reduction and ranging optical imaging system having an image sensor with pixels, the method comprising:
   generating a first light beam with a power spectral density;
   generating a reference light beam from the first light beam;
   emitting the first light beam with a power spectral density;
   collecting scattered light and reflected light respectively reflected from a scattering medium and a target;
   determining a power spectral density of the first light beam so that the first light beam is substantially coherent with the scattered light;
   delaying the reference light beam by a first delay, where the first delay is substantially equal to the round-trip delay between a scattering medium and the glare reduction and ranging optical imaging system;
   adjusting the power spectral density of the first light beam so that the reference light beam is substantially coherent with the scattered light;
   on a pixel by pixel basis, modifying the amplitude and phase of the reference light beam to minimize the direct current (DC) light power at each pixel;
   storing the modified amplitude and phase that results in a substantially minimum detected DC light power for each pixel;
   increasing power spectral density of a second reference light beam;
   modulating the amplitude of the second reference light beam with a sinusoidal signal having a frequency;

on a pixel by pixel basis, detecting the substantially maximum signal level at the modulation frequency on a pixel by adjusting a second delay of the reference light beam; and determining range to a target.

2. The method of claim 1, further comprising displaying at least one of:

an image of the target and the calculated range.

3. The method of claim 1, further comprising obtaining the first delay from at least one sensor.

4. The method of claim 1, wherein storing the modified amplitude and phase that results in the substantially minimum detected DC light power for each pixel comprises storing the modified amplitude and phase determined by interpolation.

5. A glare suppression and ranging system, comprising:

a processing system;

a glare reduction and ranging optical system, coupled to the processing system, comprising:

a light source generating a source light beam;

a first signal generator coupled to the light source;

wherein the first signal generator is configured to modify power spectral density of the source light beam;

a first beam splitter optically coupled to the source light beam;

wherein the first beam splitter creates an output light beam and a first reference light beam;

wherein the output light beam is configured to be emitted, and generate a scattering beam and a reflected beam;

a second beam splitter optically coupled to the first reference light beam;

wherein the second beam splitter creates a second reference light beam;

first optical circuitry configured to adjust the amplitude and phase of the first reference light beam;

second optical circuitry configured to adjust delay and power spectral density, and to frequency modulate the second reference light beam;

third optical circuitry configured to adjust the delay of the source light beam; and an image sensor comprising pixels configured to receive the scattering beam, reflected beam, adjusted first light reference beam, and adjusted second reference light beam.

6. The glare suppression and ranging system of claim 5, wherein the processing system further comprises:

a memory; and a processor coupled to a memory.

7. The glare suppression and ranging system of claim 6, wherein the memory comprises a range determination and imaging system and a glare suppression system.

8. The glare suppression and ranging system of claim 5, wherein the first optical circuitry comprises:

a first amplitude modulator coupled to the processing system; and a first phase modulator coupled to the amplitude modulator and the processing system.

9. The glare suppression and ranging system of claim 5, wherein the second optical circuitry comprises:

a first variable optical delay line;

a second amplitude modulator coupled to the first optical delay line;

a second phase modulator coupled to the second amplitude modulator;

a second signal generator coupled to the second amplitude modulator; and a third signal generator coupled to the second phase modulator and the processing system.

10. The glare suppression and ranging system of claim 5, further comprising an objective lens optically coupled to the image sensor.

11. A system, comprising:

a glare suppression and ranging system, comprising:

a processing system;

a glare reduction and ranging optical system, coupled to the processing system, comprising:

a light source generating a source light beam;

a first signal generator coupled to the light source;

wherein the first signal generator is configured to modify power spectral density of the source light beam;

a first beam splitter optically coupled to the source light beam;

wherein the first beam splitter creates an output light beam and a first reference light beam;

wherein the output light beam is configured to be emitted, and generates a scattering beam and a reflected beam;

a second beam splitter optically coupled to the first reference light beam;

wherein the second beam splitter creates a second reference light beam;

first optical circuitry configured to adjust the amplitude and phase of the first reference light beam;

second optical circuitry configured to adjust delay and power spectral density, and to frequency modulate the second reference light beam;

third optical circuitry configured to adjust the delay of the source light beam; and an image sensor comprising pixels configured to receive the scattering beam, reflected beam, adjusted first light reference beam, and adjusted second reference light beam; and at least one input/output device.

12. The system of claim 11, further comprising at least one of: (a) at least one sensor coupled to the glare suppression and ranging system, (b) a time, location and vector velocity detection system coupled to the glare suppression and ranging system, and (c) a communications system coupled to the glare suppression and ranging system.

13. The glare suppression and ranging system of claim 11, wherein the processing system further comprises:

a memory; and a processor coupled to a memory.

14. The glare suppression and ranging system of claim 11, wherein the memory comprises a range determination and imaging system and a glare suppression system.

15. The glare suppression and ranging system of claim 11, wherein the first optical circuitry comprises:

a first amplitude modulator coupled to the processing system; and a first phase modulator coupled to the amplitude modulator and the processing system.

16. The glare suppression and ranging system of claim 11, wherein the second optical circuitry comprises:

a first variable optical delay line;

a second amplitude modulator coupled to the first optical delay line;

a second phase modulator coupled to the second amplitude modulator;

a second signal generator coupled to the second amplitude modulator; and a third signal generator coupled to the second phase modulator and the processing system.

\* \* \* \* \*